(12) United States Patent
Shen (10) Patent No.: US 6,343,542 B1
(45) Date of Patent: Feb. 5, 2002

(54) COFFEE-MAKING CONTAINER

(76) Inventor: Shun Tsung Shen, No. 15, Hsi-An Lane, Pu-Li Chen, Nan-Tou Hsien (TW)

(*) Notice: Subject to any disclaimer, the term of this patent is extended or adjusted under 35 U.S.C. 154(b) by 0 days.

(21) Appl. No.: 09/696,266

(22) Filed: Oct. 26, 2000

(51) Int. Cl.[7] .............................. A47J 31/10; A47J 31/02
(52) U.S. Cl. .............................. 99/299; 99/306; 99/323; 99/317
(58) Field of Search .......................... 99/323, 299, 304, 99/305, 306, 279, 322, 317, 316; 210/474, 477, 478, 479

(56) References Cited

U.S. PATENT DOCUMENTS

| 5,725,765 A | * | 3/1998 | Shen | .......................... 99/299 X |
| 5,855,160 A | * | 1/1999 | Shen | .......................... 99/299 X |

* cited by examiner

*Primary Examiner*—Reginald L. Alexander
(74) *Attorney, Agent, or Firm*—Rosenberg, Klein & Lee (57) ABSTRACT

A Coffee-making container including a main body in which a mesh rack is disposed. The center of the bottom of the main body is formed with a draining hole which is opened and closed under control of a controlling mechanism. The main body has a handle and a cap is pivotally connected with the handle for closing the opening of the main body. The mesh rack has at least one upward extending upright section for enlarging the filtering area for the coffee. A switch member is pivotally connected with the pivot sections of the handle and the cap. The switch member is leant against a leaf spring extending from the handle and controlled by the leaf spring. When the switch member is pressed down, the switch member is engaged with and located by the leaf spring and the press rod is pressed down to open the draining hole of the main body. Therefore, the coffee can quickly filter through the mesh rack and the upright section thereof and flow out from the draining hole.

5 Claims, 11 Drawing Sheets

COFFEE-MAKING CONTAINER

BACKGROUND OF THE INVENTION

The present invention relates to a coffee-making container by which a user can conveniently make coffee. The coffee-making container is applicable to different sizes of coffee cups.

Figure 8:
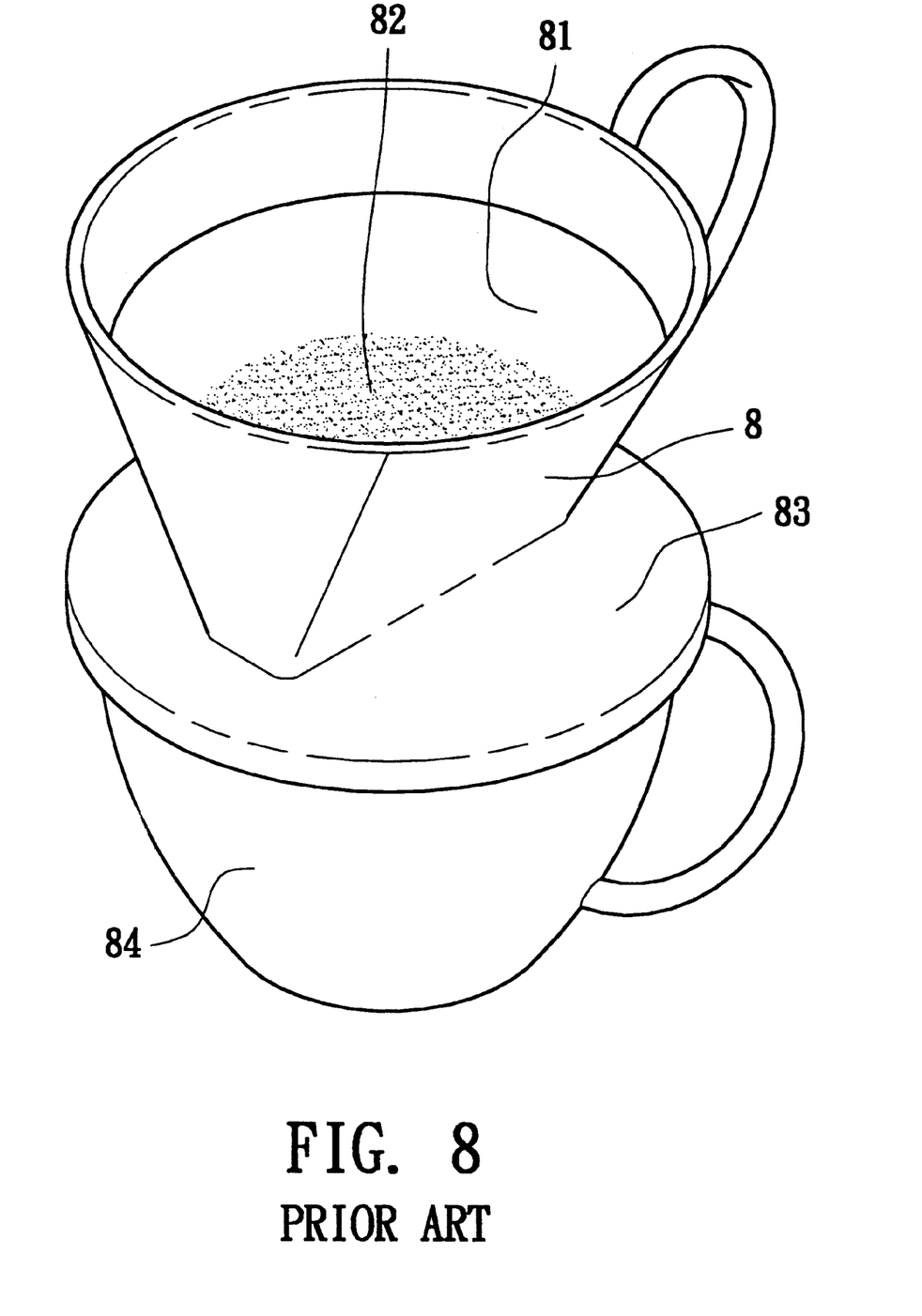
FIG. 8 is a perspective view of a conventional coffee-maker.

FIG. 8 shows a conventional coffee-maker including a cup body 8. The bottom of the cup body 8 is formed with multiple perforations (not shown). A filter paper 81 can be placed in the cup body 8 and coffee powder 82 can be placed on the filter paper 81. The bottom of the cup body 8 has a base seat 83. In use, the base seat 83 is placed on a coffee cup 84. Then boiling water is slowly circularly filled from a jug into the cup body 8 to flush the coffee powder 82. After flushing the coffee powder 82, the boiling water slowly filters through the filter paper 81 and flows into the coffee cup 84 under the cup body 8. The above procedure is quite troublesome and time-consuming and is inconvenient to a user. Moreover, after used, the filter paper 81 is discarded. This is not economic and fails to meet the requirement of environmental protection.

Figure 9:
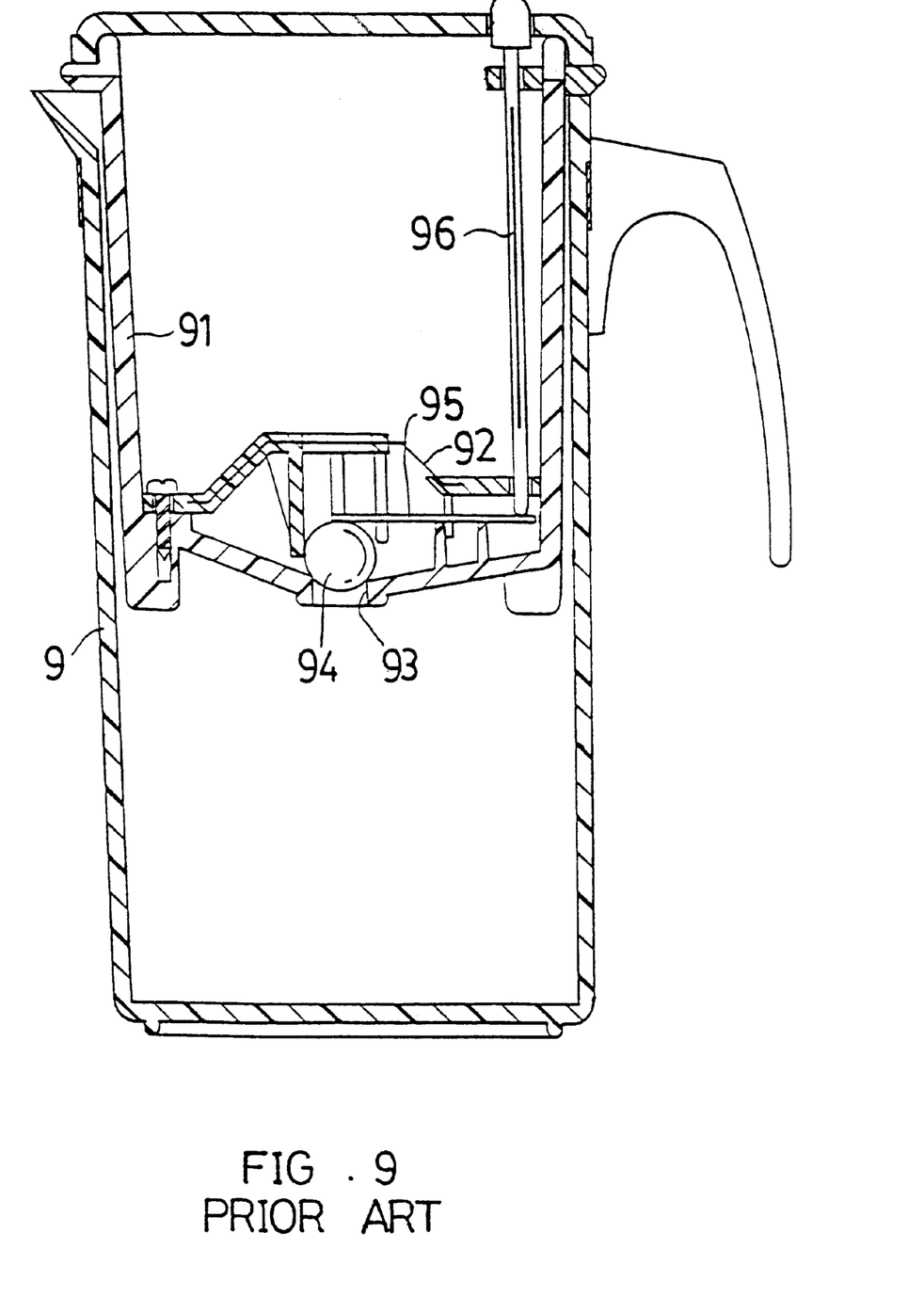
FIG. 9 is a sectional view of a conventional tea-maker.

FIG. 9 shows a conventional tea-maker including an outer cup 9 and an inner cup 91 placed in the outer cup 9. The bottom of the inner cup 91 is disposed with a filter mesh 92 and a draining hole 93 which is opened and closed under control of a steel ball 94. The steel ball 94 is connected with a link 95 controlled by a press lever 96 for controlling descending/ascending of the steel ball 94 and thus controlling the opening/closing of the draining hole 93.

In the case that coffee powder is placed into the inner cup 91 of the tea-maker for making coffee, the boiling water can be directly poured into the inner cup 91 to soak the coffee powder rather than slowly filled into the inner cup 91 as the conventional coffee-maker. However, the filter mesh 92 is positioned on the bottom of the inner cup 91 and after soaked, the smaller coffee particles will fall onto the bottom to block the filter mesh 92. As a result, the coffee will filter through the filter mesh 92 at a very slow speed and the coffee powder will be soaked in the water for a too long time. Therefore, the coffee will taste bitter and astringent. Furthermore, the user needs to continuously press the press lever 96 for making the coffee continuously flow into the outer cup 9. This is inconvenient to the user.

SUMMARY OF THE INVENTION

It is therefore a primary object of the present invention to provide a coffee-making container in which the mesh rack for filtering the coffee residue has an upward extending upright section which enlarges the filtering area of the coffee. Therefore, the mesh rack is prevented from being blocked by the coffee residue. A switch member is pivotally connected with the pivot sections of the handle and the cap. When the switch member is depressed, the switch member is engaged with and located by the leaf spring, whereby the press rod of the controlling mechanism is pressed down to keep the draining hole open. Therefore, the coffee can be quickly made and flow out.

It is a further object of the present invention to provide the above coffee-making container in which the bottom of the main body is pivotally disposed with multiple support legs which can be outward pivotally rotated to enlarge the supporting range for application to different sizes of coffee cups.

It is still a further object of the present invention to provide the above coffee-making container in which when the cap is turned open, the switch member is driven to turn upward. At this time, the steel ball of the controlling mechanism will fall down due to its own weight to block the draining hole.

The present invention can be best understood through the following description and accompanying drawings wherein:

DETAILED DESCRIPTION OF THE PREFERRED EMBODIMENTS

Please refer to FIGS. 1 to 7. The coffee-making container of the present invention includes a main body 1 in which a mesh rack 2 is disposed. The mesh rack 2 has an upward extending upright section 21. In this embodiment, the upright section 21 upward extends from the center of the mesh rack 2 as a pole. The mesh rack 2 divides the interior space of the main body 1 into an upper receptacle 11 and a lower receptacle 12. The center of the bottom of the main body 1 is formed with a draining hole 13 which is opened and closed under control of a controlling mechanism 3. The controlling mechanism 3 includes a press rod 31, a link 32 and a steel ball 33 disposed at an end of the link 32. In normal state, the steel ball 33 will fall down due to its own weight to block the draining hole 13. When the press rod 31 is pressed down, the link 32 is retained by a rib 14, whereby the end of the link 32 with the steel ball 33 is lifted to open the draining hole 13. The main body has a handle 15. A cap 16 is pivotally connected with upper end of the handle 15 for closing the opening 101 of the main body 1. The cap 16 has a press section 161 extending from the pivot section. A switch member 17 is pivotally connected with the pivot sections of the handle 15 and the cap 16. The switch member 17 is leant against a leaf spring 151 and controlled thereby. The leaf spring 151 integrally extends from the handle 15 and is formed with a projecting engaging face 152 on top side. The switch member 17 is formed with a projecting block 171 corresponding to the engaging face 152. When the press rod 31 is pressed down by the switch member 17, the projecting block 171 of the switch member 17 is engaged with and stopped by the engaging face 152 of the leaf spring 151. When the switch member 17 is pressed down and stopped and located by the leaf spring 151, the press rod 31 is pressed down to open the draining hole 13 of the main body 1. The pivot section of the cap 16 is formed with a notch 162 for receiving the switch member 17. When the cap 16 is pivotally turned up, the edge of the notch 162 will upward push the switch member 17. The bottom of the main body 1 is pivotally disposed with multiple support legs 18 which can be outward pivotally rotated to enlarge the supporting range.

Figure 1:
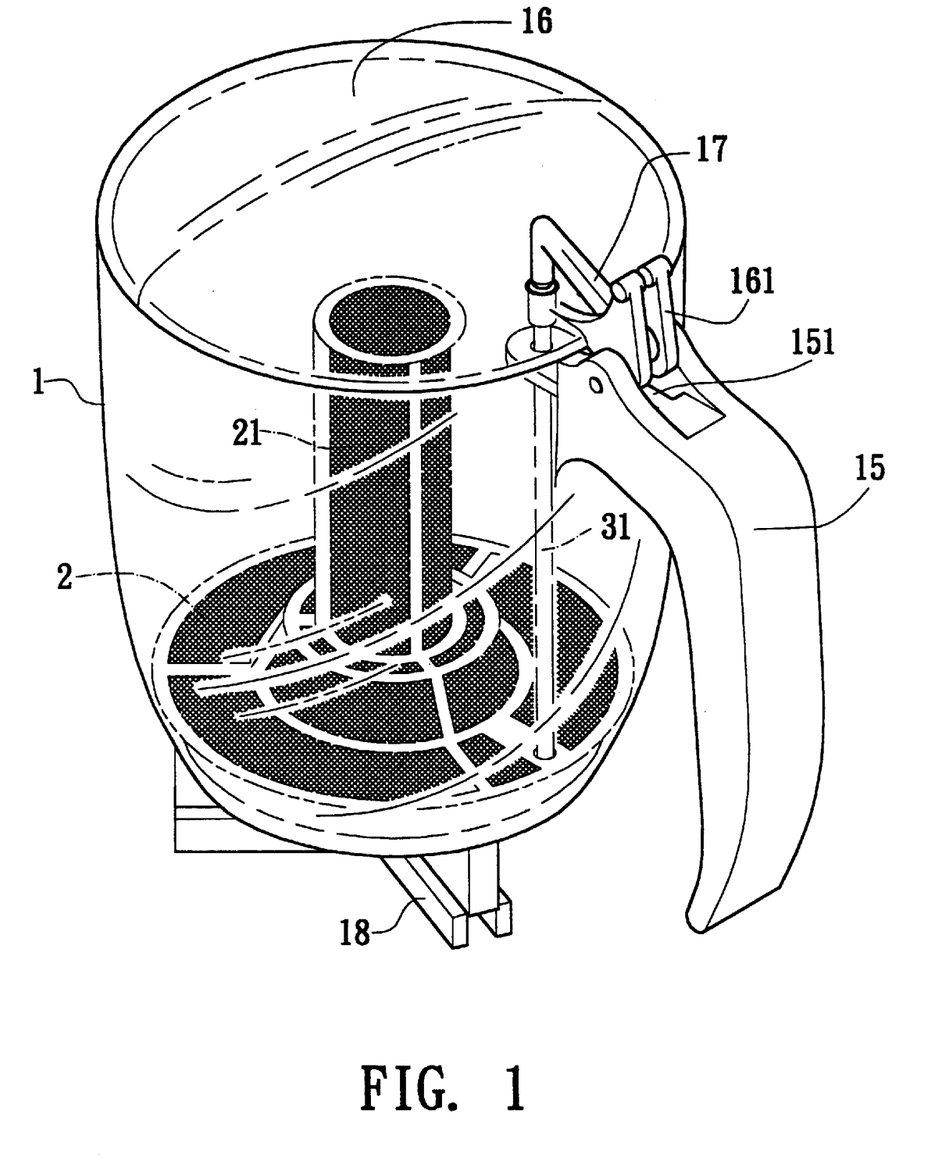
FIG. 1 is a perspective assembled view of the present invention.
Figure 2:
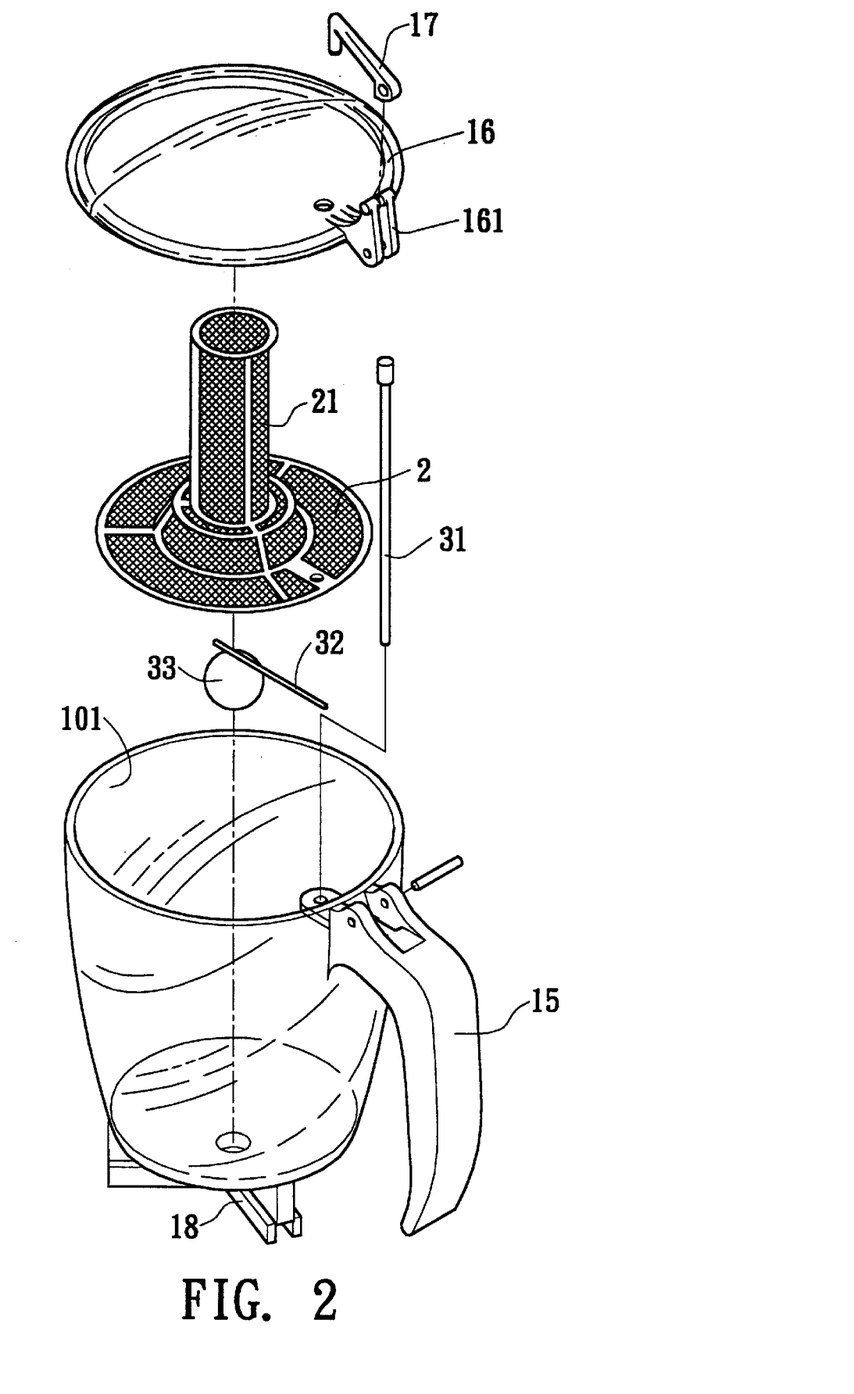
FIG. 2 is a perspective exploded view of the present invention.
Figure 3:
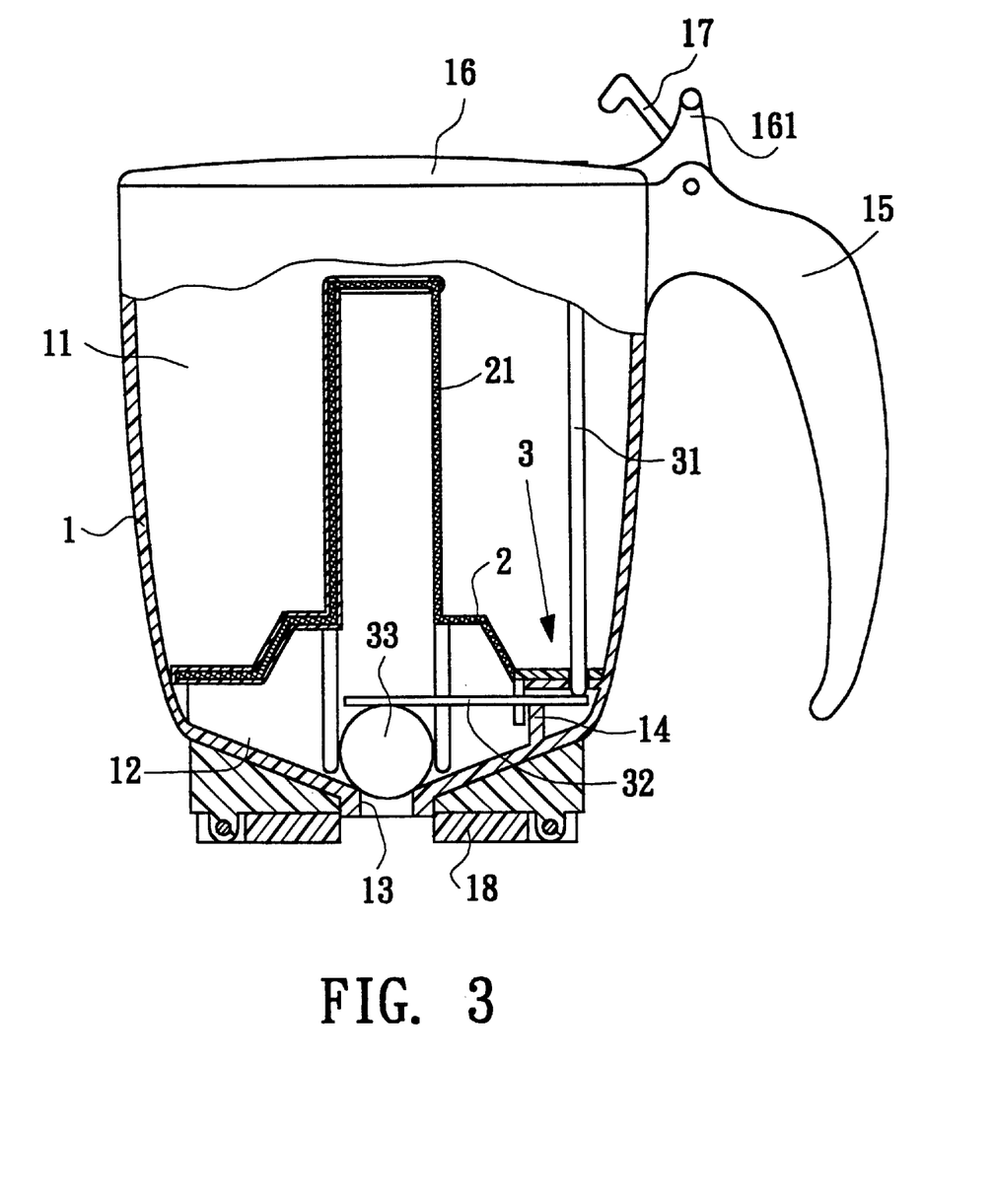
FIG. 3 is a plane sectional view of the present invention.
Figure 4A:
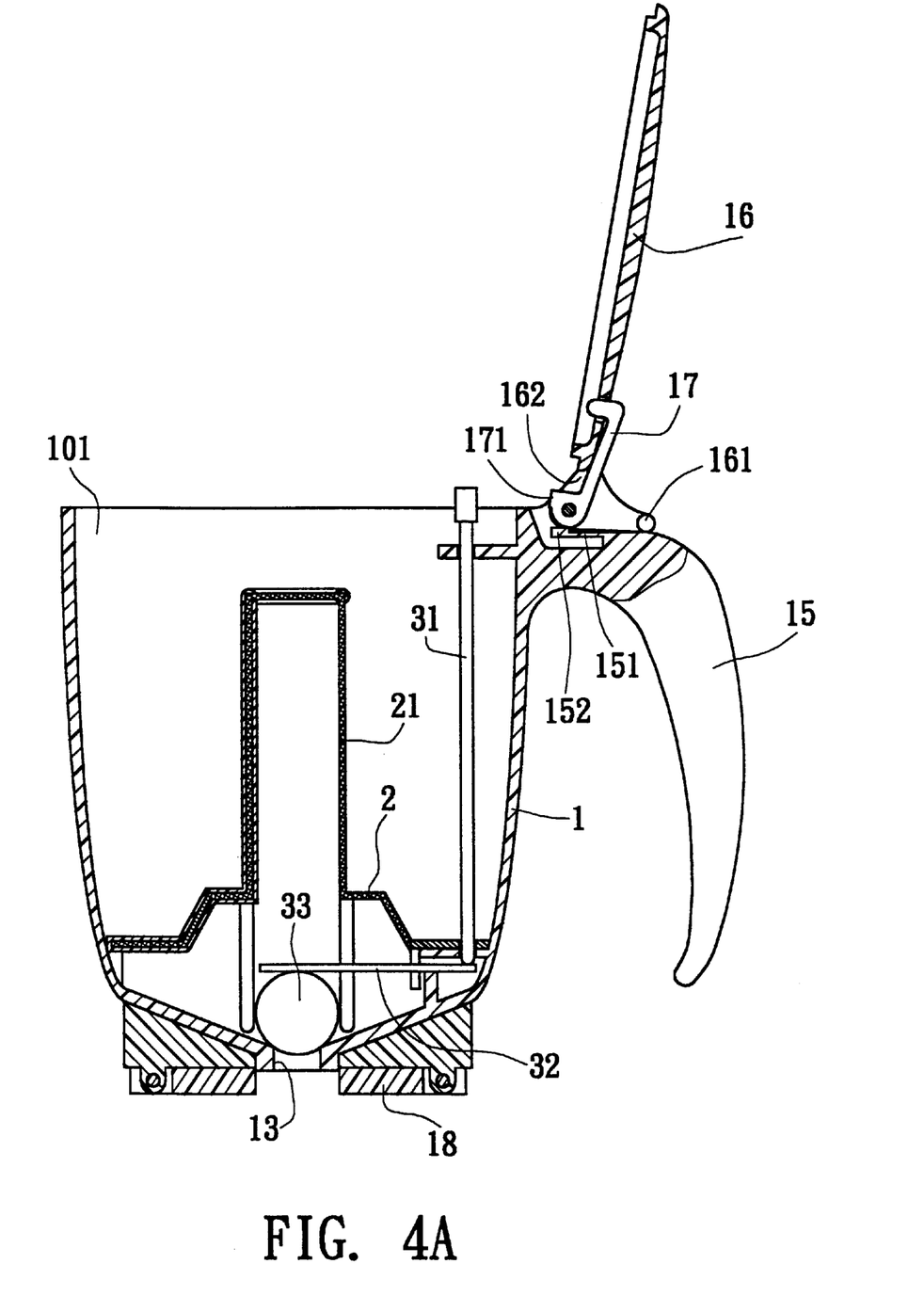
FIG. 4A is a sectional view showing that the cap of the present invention is pivotally turned open.
Figure 4B:
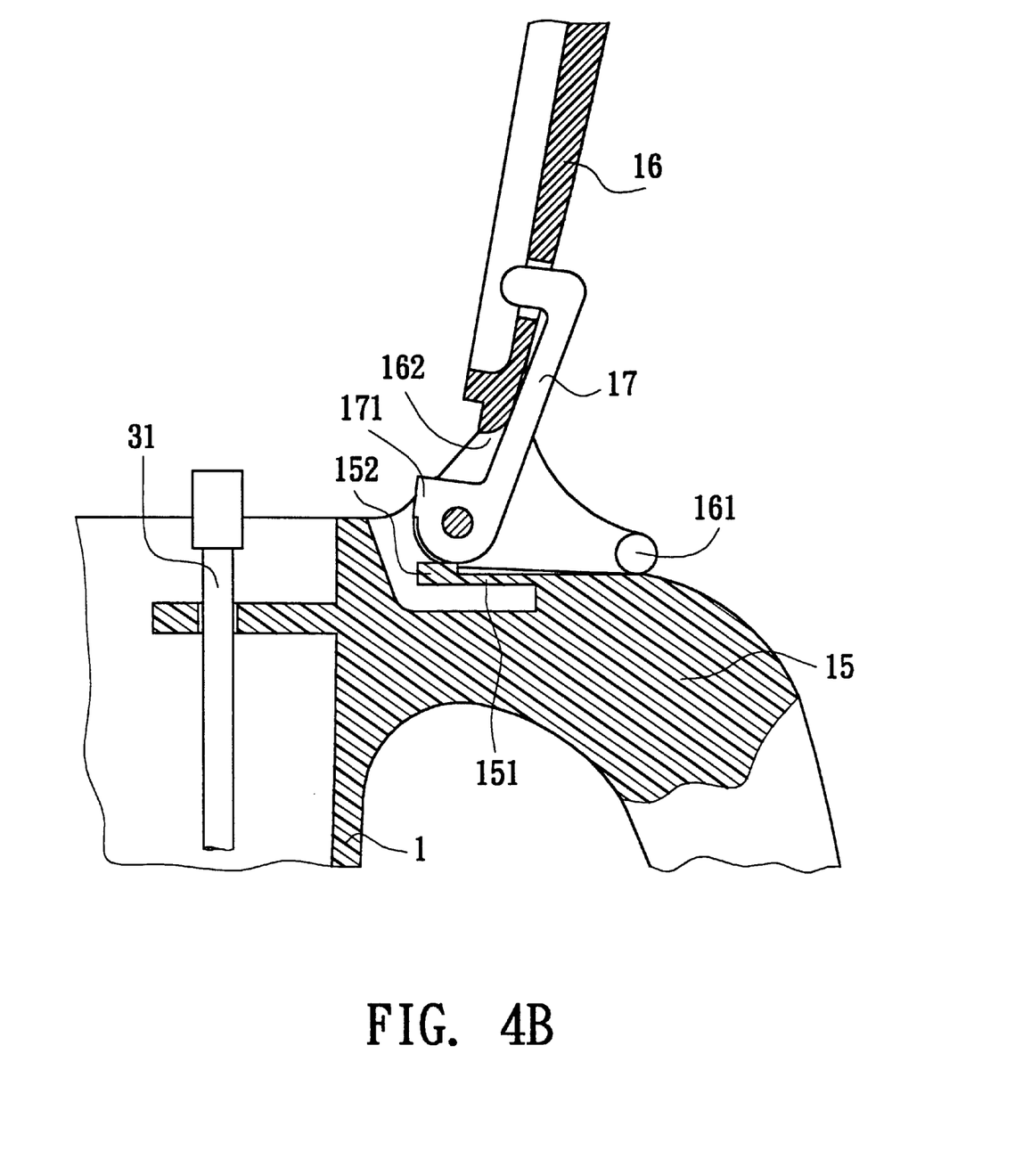
FIG. 4B is an enlarged view of a part of FIG. 4A.
Figure 5:
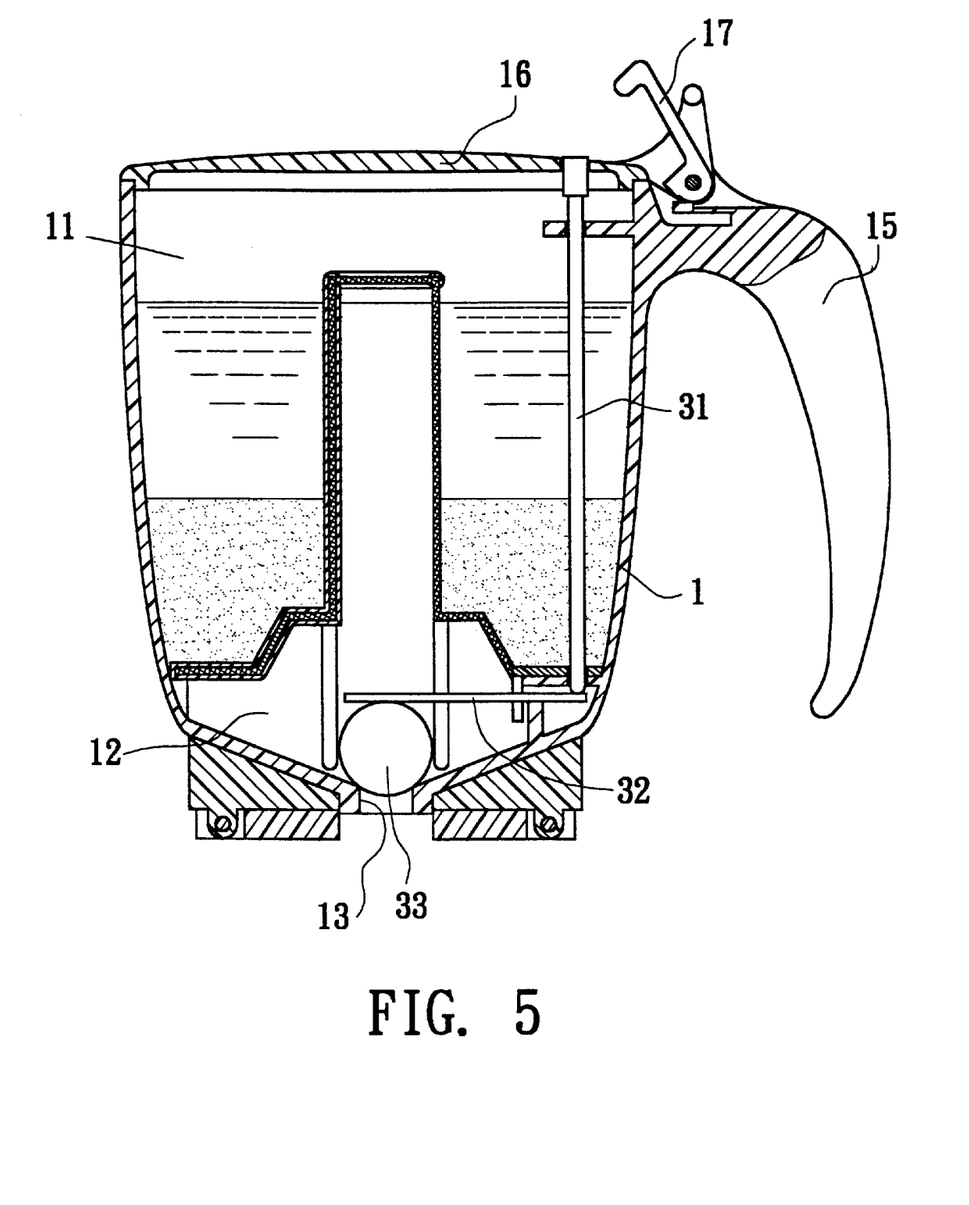
FIG. 5 shows the coffee powder is soaked in the water contained in the coffee-making container of the present invention for making coffee.
Figure 6A:
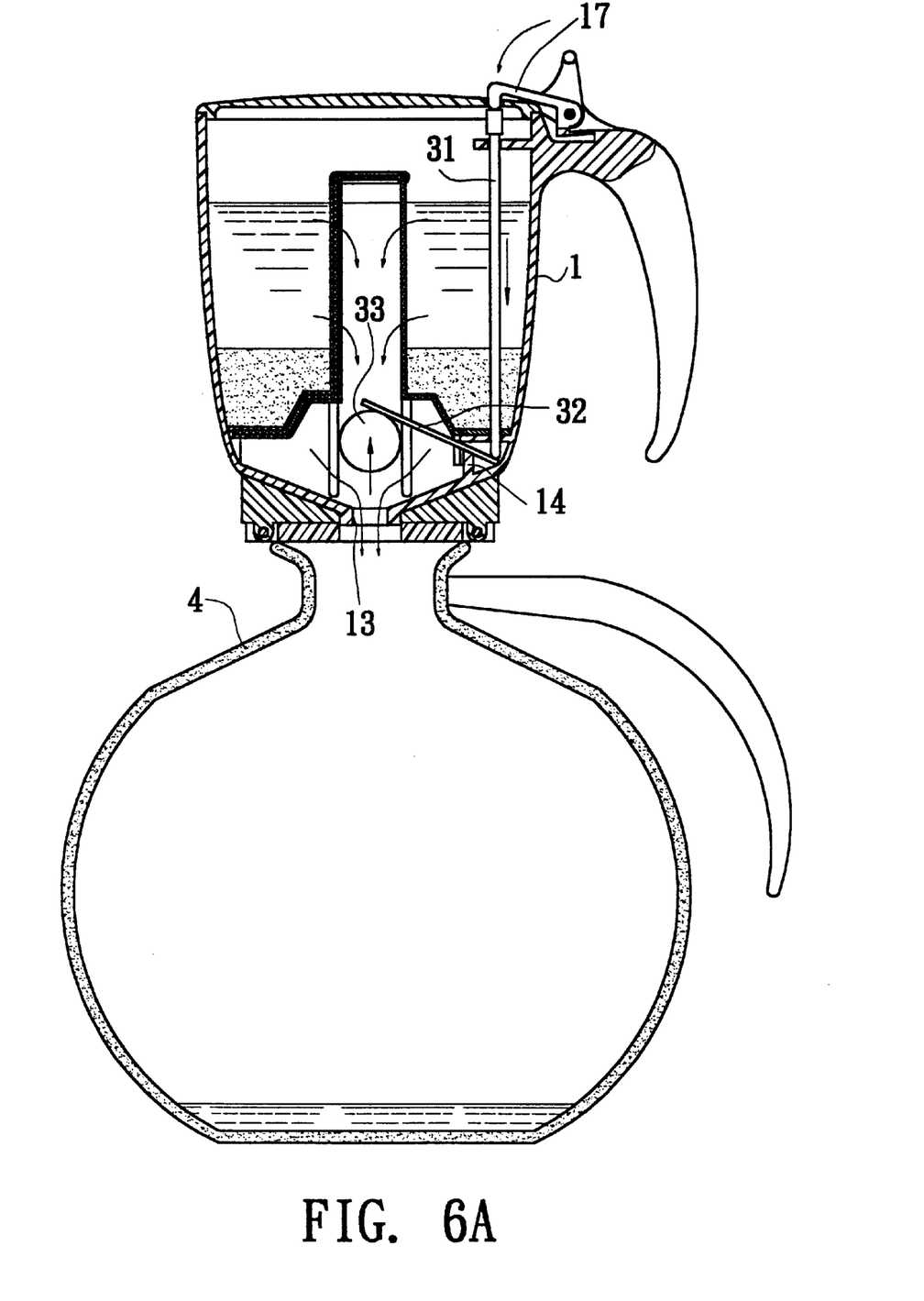
FIG. 6A is a sectional view showing that the switch member of the present invention is depressed to open the draining hole.
Figure 6B:
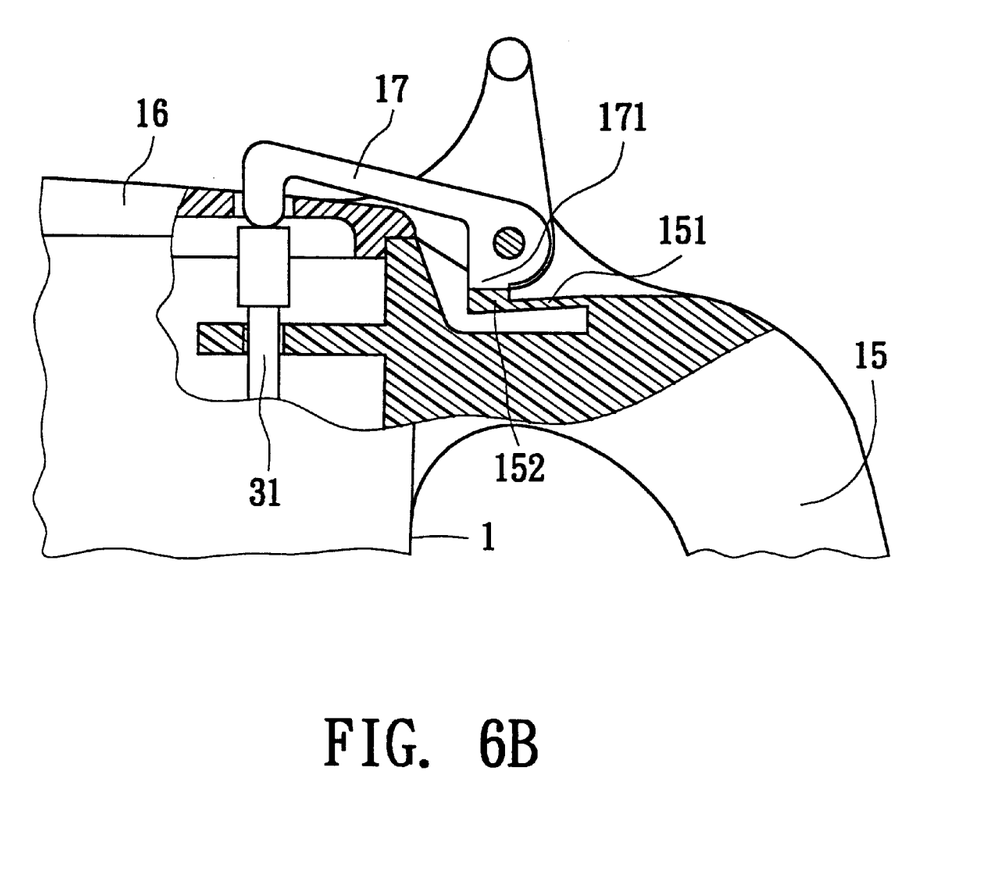
FIG. 6B is an enlarged view of a part of FIG. 6A.

Please refer to FIGS. 4A and 4B. In use, the cap 16 is first pivotally turned up by over 90 degrees and located. When the cap 16 is turned open, the switch 17 is driven and pivotally upward rotated. At this time, the steel ball 33 of the controlling mechanism 3 will fall down due to its own weight to block the draining hole 13. Then coffee powder is placed into the upper receptacle 11 of the main body 1 and boiling water is poured in. Then the cap 16 is closed and the coffee powder is soaked in the boiling water as shown in FIG. 5. After a period of time of soaking, when a user depresses the switch member 17 to make the projecting block 171 thereof engaged with the engaging face 152 of the leaf spring 151, the switch member 17 is resiliently pressed and located by the leaf spring 151 as shown in FIGS. 6A and 6B. Therefore, it is unnecessary to continuously depress the switch member 17. At this time, the switch member 17 presses down the press rod 31 which drives the link 32 to lift the steel ball 33 for opening the draining hole 13. Under such circumstance, the coffee can quickly flow down through the mesh rack 2 and the upright section 21 thereof into the lower receptacle 12 and flow through the draining hole 13 into the cup 4. The upright section 21 of the mesh rack 2 is positioned at a higher place in an upright state so that the coffee powder can hardly block the upright section 21 and can quickly flow therethrough. Therefore, the problem of over-soaking can be eliminated.

Figure 7:
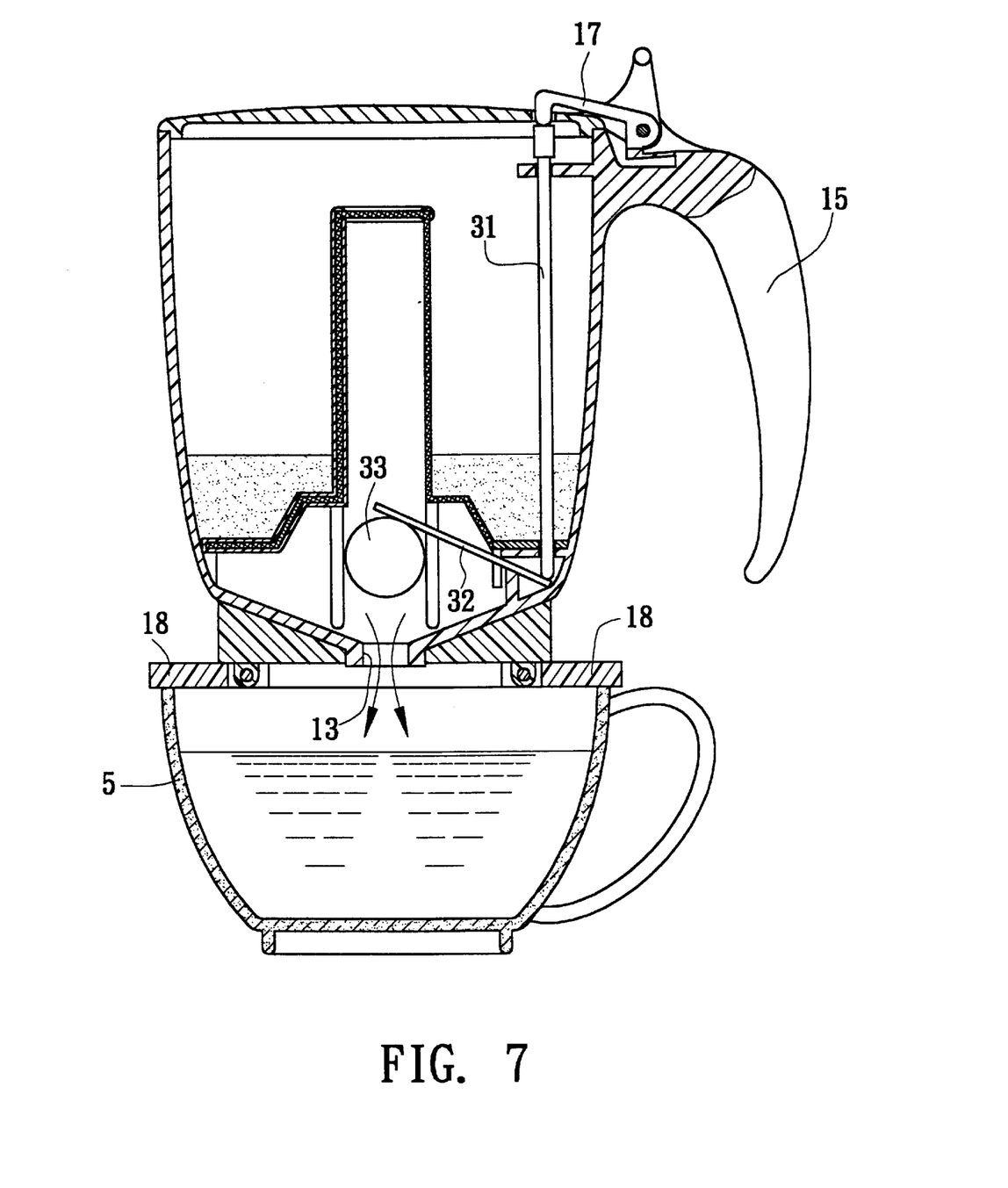
FIG. 7 is a sectional view showing that the present invention is co-used with a coffee cup with larger diameter.

In the case of a cup 5 with larger diameter, the support legs 18 of the bottom of the main body 1 can be outward turned to enlarge the supporting range. Under such circumstance, the support legs 18 can be leant on the edge of the cup 5 to support the main body 1.

In conclusion, the mesh rack 2 for filtering the coffee residue has an upward extending upright section 21 which enlarges the filtering area of the coffee. Therefore, the mesh rack 2 is prevented from being blocked by the coffee residue. The switch member 17 is pivotally connected with the pivot sections of the handle 15 and the cap 16. When the switch member 17 is depressed, the switch member 17 is engaged with and located by the leaf spring 15, whereby the press rod 31 of the controlling mechanism 3 is pressed down to keep the draining hole 13 open. Therefore, the coffee can be quickly made and flow out. When the cap 16 is turned open, the switch member 17 is driven to turn upward. At this time, the steel ball 33 of the controlling mechanism 3 will fall down due to its own weight to block and seal the draining hole 13. In addition, the bottom of the main body 1 is pivotally disposed with multiple support legs 18 which can be outward pivotally rotated to enlarge the supporting range for application to different sizes of coffee cups 5.

Alternatively, the upright section 21 of the mesh rack 2 can be inclined or arranged around the mesh rack 2. These can achieve the same effect as the first embodiment.

The above embodiments are only used to illustrate the present invention, not intended to limit the scope thereof. Many modifications of the above embodiments can be made without departing from the spirit of the present invention.

What is claimed is:

1. A Coffee-making container comprising a main body in which a mesh rack is disposed, the mesh rack dividing an interior space of the main body into an upper receptacle and a lower receptacle, the main body having a bottom face, a center of the bottom of the main body being formed with a draining hole which is opened and closed under control of a controlling mechanism, the controlling mechanism including a press rod, a link and a steel ball disposed at an end of the link, in normal state, the steel ball falling down due to its own weight to block the draining hole, when the press rod is pressed down, the link being driven, whereby the end of the link with the steel ball is lifted to open the draining hole, the main body having a handle, a cap being pivotally connected with the handle, the cap having a press section extending from a pivot section of the cap, said coffee-making container being characterized in that the mesh rack has at least one upward extending upright section, a switch member being pivotally connected with the pivot sections of the handle and the cap, the switch member being leant against a leaf spring extending from the handle and controlled by the leaf spring, whereby when the switch member is pressed down, the switch member is engaged with and located by the leaf spring and the press rod is pressed down to open the draining hole of the main body.

2. A Coffee-making container as claimed in claim 1, wherein the upright section of the mesh rack upward extends from the center of the mesh rack as a pole.

3. A Coffee-making container as claimed in claim 1, wherein the leaf spring integrally extends from the handle and is formed with a projecting engaging face on top side, the switch member being formed with a projecting block corresponding to the engaging face, whereby when the press rod is pressed down by the switch member, the projecting block of the switch member is engaged with and stopped by the engaging face of the leaf spring.

4. A Coffee-making container as claimed in claim 1, wherein the pivot section of the cap is formed with a notch for receiving the switch member, when the cap is pivotally turned up, an edge of the notch upward pushing the switch member.

5. A Coffee-making container as claimed in claim 1, wherein the bottom of the main body is pivotally disposed with multiple support legs which can be outward pivotally rotated to enlarge the supporting range.

* * * * *